(12) United States Patent
Fiennes et al.

(10) Patent No.: US 8,171,322 B2
(45) Date of Patent: May 1, 2012

(54) PORTABLE ELECTRONIC DEVICES WITH POWER MANAGEMENT CAPABILITIES

(75) Inventors: Hugo Fiennes, Mountain View, CA (US); Michael Victor Yeh, Cupertino, CA (US); Xingqun Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 903 days.

(21) Appl. No.: 12/135,122

(22) Filed: Jun. 6, 2008

(65) Prior Publication Data

US 2009/0307511 A1    Dec. 10, 2009

(51) Int. Cl.
*G06F 1/00* (2006.01)
(52) U.S. Cl. .................................. 713/323; 710/260
(58) Field of Classification Search .................. 713/322, 713/324, 323, 300; 710/260
See application file for complete search history.

(56) References Cited

U.S. PATENT DOCUMENTS

| | | | | |
|---|---|---|---|---|
| 5,708,819 | A * | 1/1998 | Dunnihoo | 713/323 |
| 5,822,598 | A | 10/1998 | Lam | |
| 6,449,724 | B1 * | 9/2002 | Sakagami | 713/300 |
| 6,564,330 | B1 * | 5/2003 | Martinez et al. | 713/322 |
| 6,865,621 | B2 * | 3/2005 | Iwata | 710/20 |
| 2003/0105983 | A1 * | 6/2003 | Brakmo et al. | 713/320 |
| 2003/0139931 | A1 * | 7/2003 | Park | 704/275 |
| 2006/0015197 | A1 | 1/2006 | Gupta | |
| 2006/0041895 | A1 * | 2/2006 | Berreth | 719/328 |
| 2007/0255435 | A1 * | 11/2007 | Cohen et al. | 700/94 |

OTHER PUBLICATIONS

"WM8400", Product Flyer, Wolfson Microelectronics, [online], [retrieved on Jun. 6, 2008], <URL: http://www.wolfsonmicro.com/uploads/documents/en/WM8400_ProductFlyer.pdf>.
"WM8350", Product Flyer, Wolfson Microelectronics, [online], [retrieved on Jun. 6, 2008], <URL: http://www.wolfsonmicro.com/uploads/documents/en/WM8350_product%20flyer_final.pdf>.

* cited by examiner

*Primary Examiner* — Chun Cao
*Assistant Examiner* — Xuxing Chen
(74) *Attorney, Agent, or Firm* — Treyz Law Group; David C. Kellogg; G. Victor Treyz (57) ABSTRACT

An electronic device may operate in standby and active modes. A headset may be coupled to the electronic device. The electronic device may have audio codec circuitry. The audio codec circuitry may use general purpose input-output circuitry in handling button and headset activity during active mode. Processing circuitry may be used to reconfigure the audio codec in real time. When the electronic device is in the standby mode and activity is detected, the codec may be configured to provide an interrupt signal to a power management unit that wakes the device. When the electronic device is in active mode and no user inputs are received within a given period of time, the central processor in the electronic device may place the device in standby mode.

29 Claims, 9 Drawing Sheets

(PRIOR ART)

PORTABLE ELECTRONIC DEVICES WITH POWER MANAGEMENT CAPABILITIES

BACKGROUND

This invention relates generally to portable electronic devices, and more particularly, to portable electronic devices with power management capabilities.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, handheld electronic devices may use long-range wireless communications to communicate with wireless base stations and may use short-range communications to communicate with accessories and local networks.

Portable electronic devices are also sometimes provided with music playback capabilities. The circuitry used for functions such as wireless communications and media playback can consume a relatively large amount of power. Nevertheless, manufacturers have made attempts to miniaturize the batteries used in handheld electronic devices, which reduces battery capacity. Unless care is taken to consume power wisely, these devices may exhibit unacceptably short operating times.

It would therefore be desirable to be able to provide portable electronic devices with improved power management capabilities.

SUMMARY

A portable electronic device such as a handheld electronic device is provided with power management capabilities. The power management capabilities of the device may be used to help conserve power. For example, the power management functions of the device may be used to power-down unused circuitry in certain modes of operation.

The portable electronic device may operate in two or more power management modes to optimize performance and battery life. For example, the electronic device may operate in an active mode (i.e., a full-power mode) when a user is interacting with the electronic device (e.g., during normal operations) and may operate in a standby mode when a user is not interacting with the electronic device. When the electronic device is operating in the standby mode, circuitry and suitable components such as a central processing unit or CPU in the electronic device may be powered down or operated in a low-power mode to minimize the power consumption of the electronic device. The electronic device may have power management circuitry that generates power control signals that direct circuitry and components in the electronic device to enter their standby mode or, when awakening from standby, to enter their active mode. For example, when entering standby mode, power management circuitry may send signals to components in the electronic device that cause those components to turn off or to operate in a reduced power mode.

The portable electronic device may have audio codec circuitry that provides audio input-output functionality. The audio codec may facilitate media player and cellular telephone operations in the electronic device. For example, the codec circuitry may have an analog-to-digital converter for converting a user's voice received through a microphone to digital signals for cellular telephone calls, recorded memos, or video sound tracks. The codec circuitry may also have a digital-to-analog converter for converting digital audio signals into analog signals for playback over a speaker (e.g., as part of a telephone call or a media playback operation).

The portable electronic device may have an audio jack. The audio jack may provide connectivity for an external audio accessory such as a headset. A headset may have stereo speakers, a microphone, and a button for controlling the device. Headsets such as these are sometimes referred to as cellular telephone headsets. The codec circuitry may receive signals from a button in an external accessory such as a headset and from one or more buttons on the electronic device (e.g., the codec circuitry may detect button activity from one or more buttons). The codec circuitry may have headset activity detection circuitry that can detect when a headset is connected to or disconnected from the electronic device and when a button is pressed on a headset that is connected to the electronic device.

When the codec circuitry detects user activity such as headset activity or button activity, the codec circuitry may generate an interrupt signal. The codec circuitry may have registers that contain settings data that determines how the codec circuitry operates. The codec circuitry may be configured to assert the interrupt signal on one of two paths by providing the registers with appropriate settings data. For example, when the electronic device is operating in its standby mode, the codec circuitry may be configured with appropriate settings data to assert interrupt signals on a path that is coupled to a power management unit or power management circuitry. When the power management circuitry receives this interrupt, the power management circuitry may power up the electronic device. When the electronic device is operating in its active mode, the codec circuitry may be configured with appropriate data to assert interrupt signals on a path that is coupled to processing circuitry such as a central processor. When the processing circuitry receives the interrupt, the processing circuitry may perform an appropriate action (e.g., an action prompted by the detected activity).

Further features of the invention, its nature and various advantages will be more apparent from the accompanying drawings and the following detailed description of the preferred embodiments.

DETAILED DESCRIPTION

The present invention relates generally to portable electronic devices, and more particularly, to power management in portable electronic devices.

The portable electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The portable electronic devices may be, for example, cellular telephones, media players with wireless communications capabilities, handheld computers (also sometimes called personal digital assistants), remote controllers, global positioning system (GPS) devices, and handheld gaming devices. The portable electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
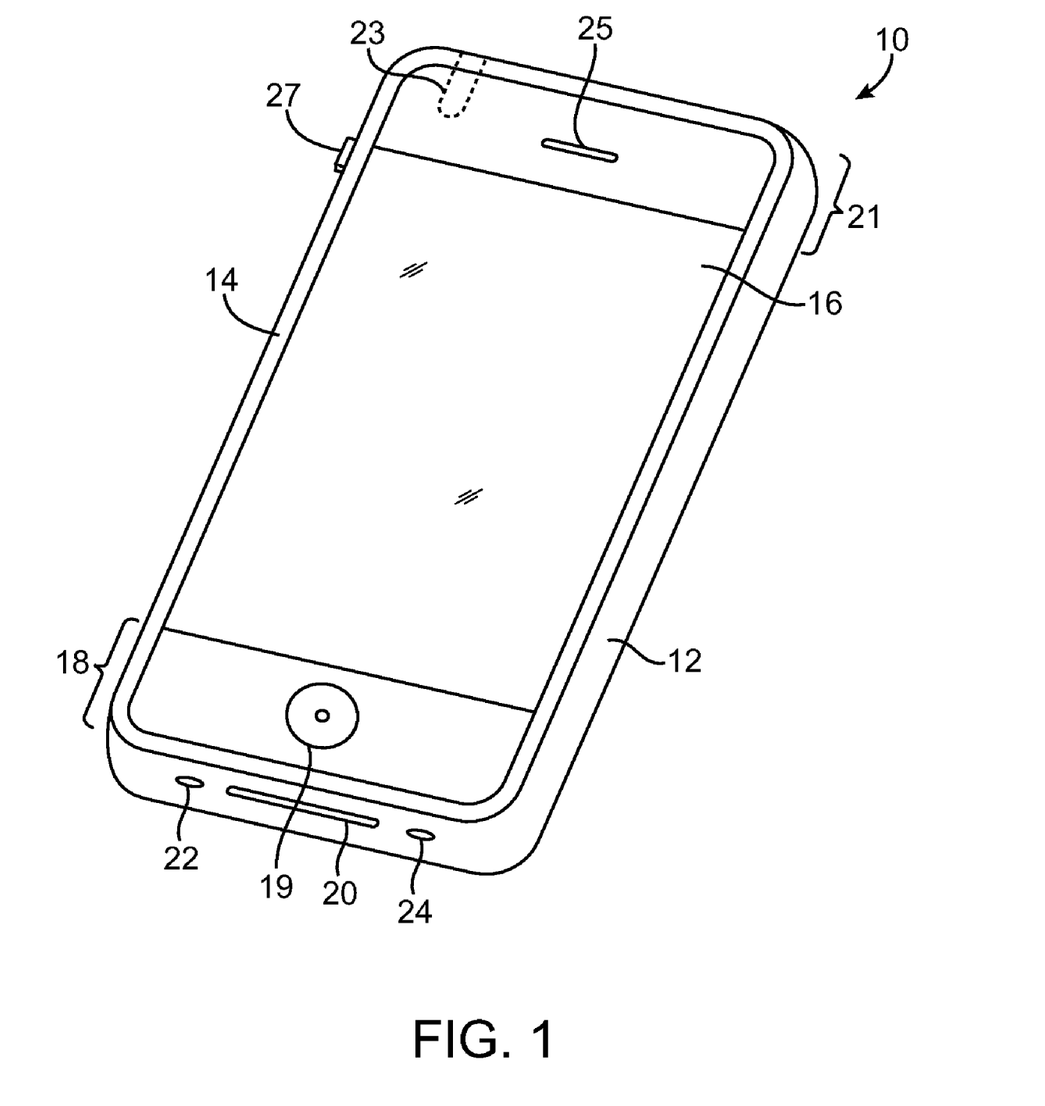
FIG. 1 is a perspective view of an illustrative electronic device having power management capabilities in accordance with an embodiment of the present invention.

An illustrative portable electronic device in accordance with an embodiment of the present invention is shown in FIG. 1. Device 10 of FIG. 1 may be, for example, a handheld electronic device.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. Housing 12 may have a bezel 14. The bezel 14 may be formed from a conductive material and may surround a display or other device with a planar surface on device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Button 27 may be, for example, a ringer A/B switch that is used to place device 10 in vibrate mode when silent operation is desired. Port 20 may contain a 30-pin data connector (as an example). Openings 22 and 24 may, if desired, form microphone and speaker ports. Speaker port 24 may be used when operating device 10 in speakerphone mode. Opening 25 may also form a speaker port. For example, speaker port 25 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

Device 10 may have an audio input-output jack such as jack 23, which may be referred to as a headset jack. As shown in FIG. 1, jack 23 may formed in a recess in the top edge of device 10 (e.g., the outline of jack 23 is illustrated by dotted lines to indicate how jack 23 may extend into the interior of device 10). In general, jack 23 may be formed in any suitable location on device 10. Jack 23 may contain a 4-pin connector such as a female connector that is sometimes referred to as a tip-ring-ring-sleeve (TRRS) connector (as an example). Jack 23 may receive a male connector that is sometimes referred to as a TRRS plug. With one suitable arrangement, jack 23 may be used to provide connectivity between device 10 and a cellular telephone headset that has a microphone, a speaker, and a button (e.g., a headset with input and output audio capabilities and a button that controls a function in device 10 such as hanging up a telephone call). With another suitable arrangement, the functionality of jack 23 may be provided with two or more connectors. For example, a first jack may provide speaker functionality and a second jack may provide microphone and user input functionality.

A user of electronic device 10 may supply input commands using user input interface devices such as button 19 and touch screen 16 and using external devices (e.g., through headset jack 23). Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, an external device such as a headset with user input functionality, or any other suitable interface for controlling device 10. Although shown schematically as being formed on the top face of electronic device 10 in the example of FIG. 1, buttons such as buttons 19 and 27 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a data port or a mating dock connected to a computer or other electronic device). Device 10 may also have audio and video jacks that allow device 10 to interface with external components. Typical ports include power pins to recharge a battery within device 10 or to operate device 10 from a direct current (DC) power supply, data pins to exchange data with external components such as a personal computer or peripheral, headset jacks, audio-visual jacks (e.g., TRRS jacks such as jack 23) to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Examples of locations in which antenna structures may be located in device 10 include region 18 and region 21. These are merely illustrative examples. Any suitable portion of device 10 may be used to house antenna structures for device 10 if desired.

If desired, electronic device 10 may be a portable electronic device such as a laptop or other portable computer. For example, electronic device 10 may be an ultraportable computer, a tablet computer, or other suitable portable computing device. Electronic device 10 may also be a handheld device. Power management considerations are particularly important in small devices such as handheld devices, because space is at a premium in small devices which limits the amount of space available for batteries.

Figure 2:
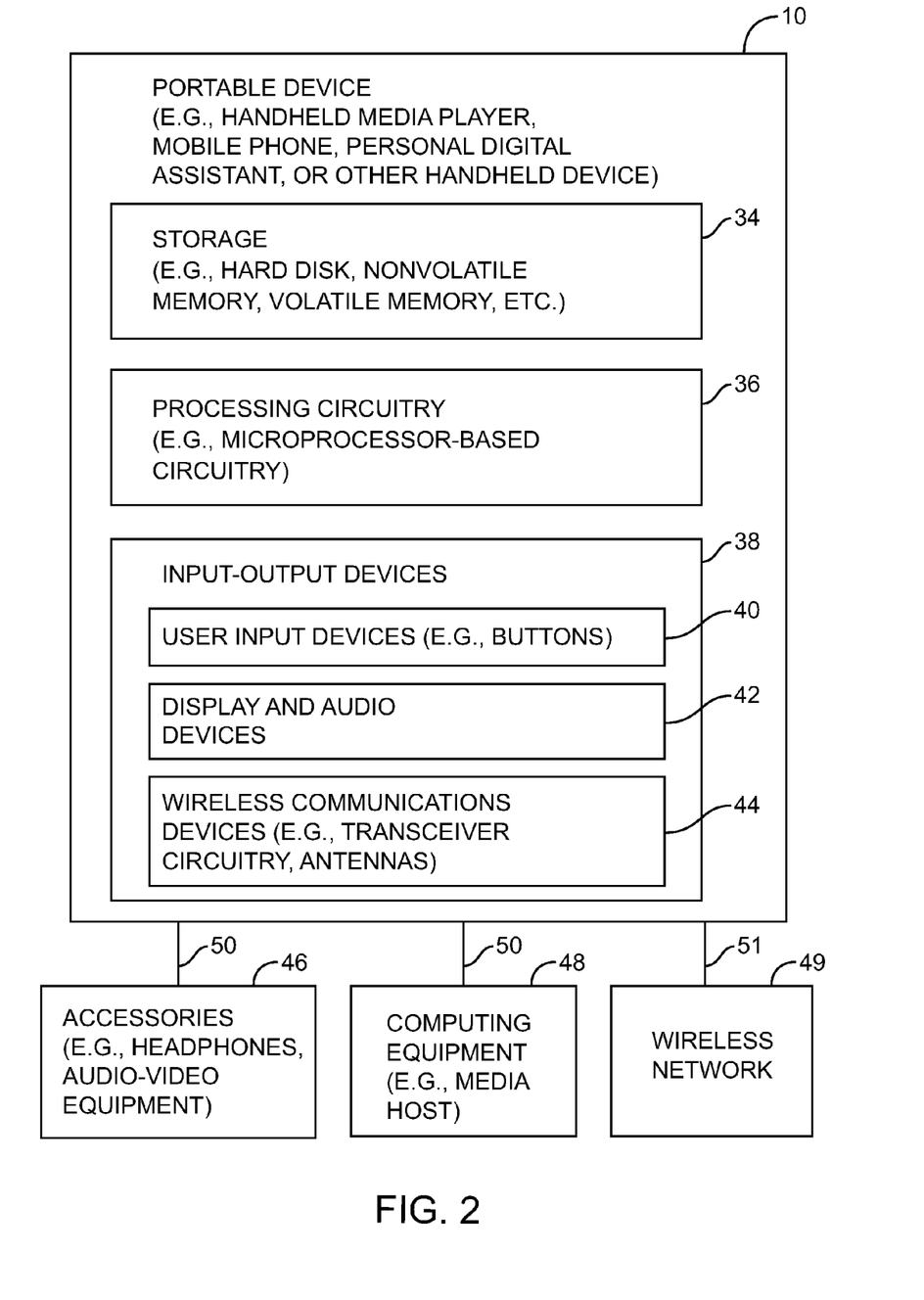
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a combination of such devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor (also sometimes referred to as a central processor unit or application processor) and other suitable integrated circuits such as power management units, cellular telephone processor chips, audio codecs, etc. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 2G and 3G cellular telephone services, etc.

To minimize power consumption, processing circuitry 36 or other suitable control circuitry on device 10 may be used in implementing power management functions. For example, processing circuitry 36 may be used to adjust the power consumption of device 10 by controlling when device 10 enters a low power mode such as a standby mode. In a low power or standby mode, certain components in device 10 may be powered down, may be powered using reduced power supply voltages, or may be operated in a reduced performance mode in which the frequency of clocks that are used to control the operation of the components is reduced. These adjustments to the operation and power consumption of device 10 may be made automatically in real time. With one suitable arrangement, processing circuitry 36 may include one or more power management units (chips) that act as power management control circuits and that handle power management functions. If desired, one or more power management units may remain active when device 10 is operating in its standby mode and may wake up a central processing unit (CPU) when device 10 enters its active mode (from its standby mode).

Input-output devices 38 may be used to allow data to be supplied to device 10 and to allow data to be provided from device 10 to external devices. Display screen 16, buttons 19 and 27, headset jack 23, and dock connector port 20 are examples of input-output devices 38.

Input-output devices 38 can include user input-output devices 40 such as buttons, headsets, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Path 51 may be a wireless path. Paths 50 may include wired and wireless paths. For example, paths 50 may include a jack such as jack 23 that provides connectivity between device 10 and a cellular telephone headset.

Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc. With one suitable arrangement, accessories 46 may include a wired headset with a speaker, a microphone, and with user input functionality. For example, accessories 46 may include a cellular telephone headset that has stereo speakers (i.e., a left speaker and a right speaker), a microphone, and that has a button for user input functionality. The button may be used to start or end a cellular telephone call, to mute the microphone and/or speaker, to initiate a voice recognition program in device 10, to control media playback operations (e.g., the button may be used as a play/pause button), or for any other suitable function.

Accessories 46 such as a cellular telephone headset may also be used to wake up device 10 from a low-power mode such as a sleep or standby mode. For example, accessories 46 such as a cellular telephone headset may be used to wake up device 10 when a button is pressed on the headset or when the headset is removed or coupled to device 10 (e.g., coupled to a jack such as jack 23). This type of arrangement may be used, for example, when device 10 is being carried in a backpack and the headset and its button are the only portions of device 10 that are readily accessible to the user.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc.

Figure 3:
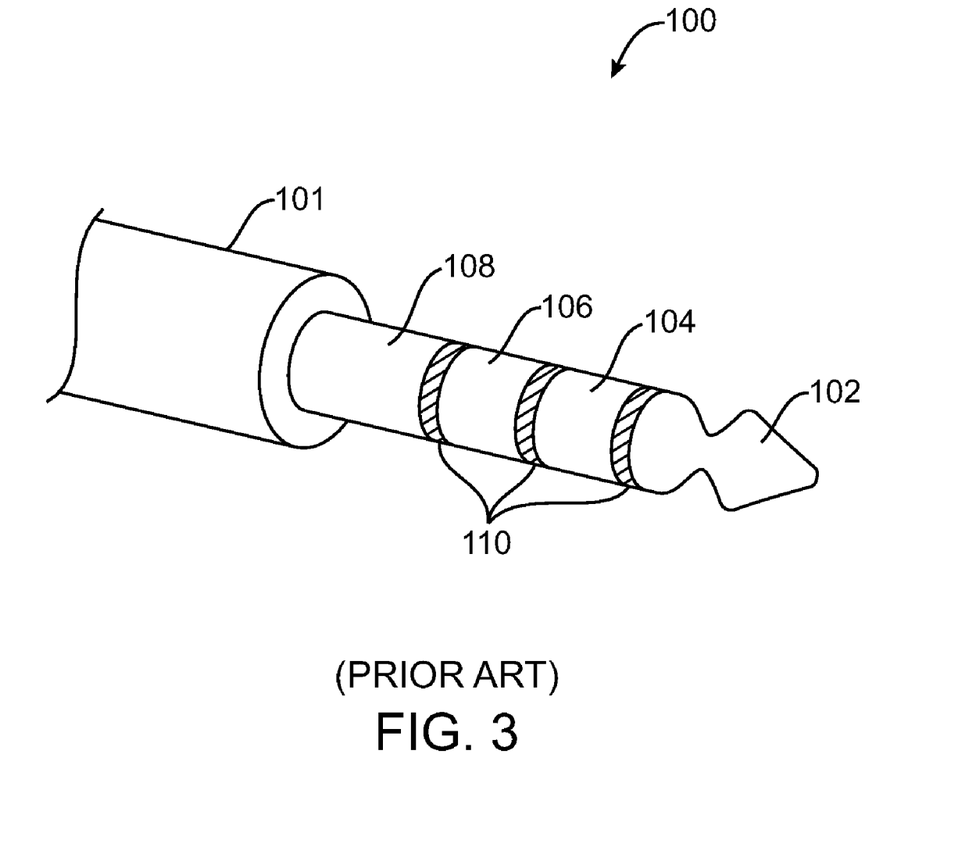
FIG. 3 is a diagram of a conventional tip-ring-ring-sleeve connector.

A conventional tip-ring-ring-sleeve connector of the type that may be used to connect a headset to a handheld device is shown in FIG. 3. Connector 100 has tip portion 102, first ring portion 104, second ring portion 106, and sleeve portion 108. Each of conductor portions 102, 104, 106, and 108 corresponds to a conductor inside connector 100 (e.g., a conductor inside cable 101). Conductor portions 102, 104, 106, and 108 are physically and electrically isolated from each other by isolation bands 110. With one suitable arrangement, a conventional tip-ring-ring-sleeve connector such as connector 100 of FIG. 3 can be used to couple an accessory (such as accessory 46 of FIG. 2) to an electronic device (such as device 10 of FIG. 2) using three separate signal paths and a ground path (sometimes referred to as a return path) that is shared by the three electrical signal paths.

Figure 4A:
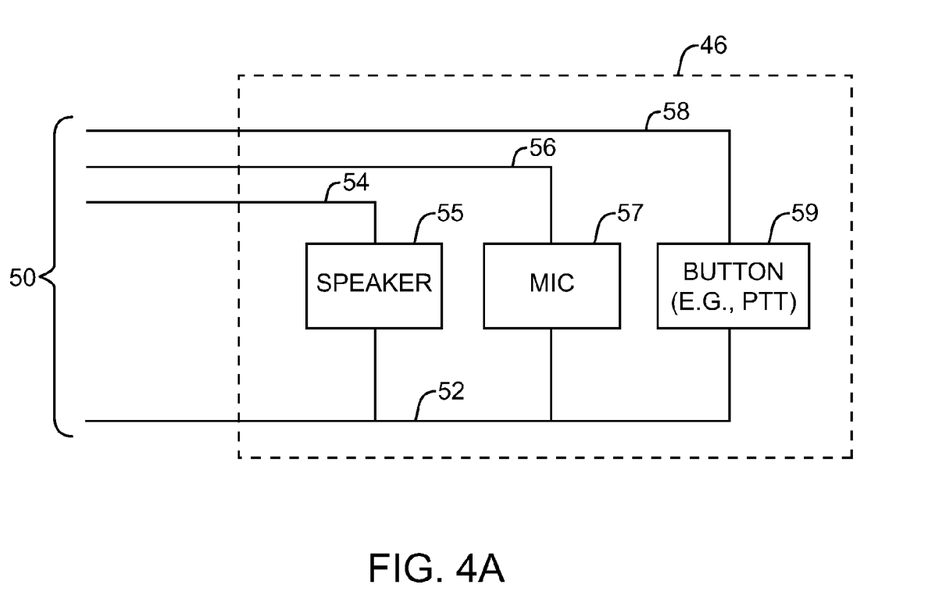
FIG. 4A is a circuit diagram of an illustrative headset device that may be coupled to an electronic device with power management capabilities in accordance with an embodiment of the present invention.

A circuit diagram of an illustrative headset device that may be coupled to device 10 using a connector such as the conventional TRRS connector of FIG. 3 or other suitable connector is shown in FIG. 4A. A headset device such as device 46 may be coupled to device 10 over path 50. Path 50 may be formed from four individual paths (conductors) such as paths 52, 54, 56, and 58. With one suitable arrangement, a headset device such as device 46 may allow a user to operate device 10 in what is commonly referred to as a hands-free mode. For example, device 10 may be a handheld device with cellular telephone capabilities and device 46 may be a wired cellular headset that allows a user to operate device 10 as a cellular telephone without requiring the user to touch device 10.

Device 46 may receive audio signals such as the audio signals for a telephone call from device 10 (e.g., over paths 52 and 54) and may play those audio signals over a speaker such as speaker 55. Speaker 55 may be, for example, a passive speaker such as the type of speaker commonly used in headphones or an active speaker which includes amplifier circuitry to boost the audio signals (e.g., to increase the volume of the audio signals). Device 46 may receive monaural or stereo audio signals from device 10.

Device 46 may have a microphone such as microphone 57 that picks up the voice of a user and converts the user's voice into audio signals (e.g., analog electrical signals). Microphone 57 may be coupled to device 10 over path 56 and ground path 52, so that device 46 provides audio signals corresponding to the user's voice to device 10.

Device 46 may have a button such as button 59. Button 59 may be coupled to device 10 over path 58 and ground path 52, as an example. In general, button 59 may be used to control any suitable function of device 10. For example, when device 10 is operating as a cellular telephone, button 59 may be used by a user to control telephone-related functions of device 10 such as a push-to-talk feature, a mute feature, an end call feature (e.g., a hang-up feature), an answer call feature (e.g., to answer an incoming telephone call), a redial feature, etc. When device 10 is operating as a media player, button 59 may be used to control functions related to media playback operations such as play, pause, stop, fast forward, etc. These are merely illustrative examples.

With one suitable arrangement, button 59 may be used to initiate a voice recognition program in device 10 such as a voice recognition program in which device 10 recognizes commands that are vocalized by a user and responds accordingly. For example, device 10 may respond (e.g., perform an appropriate action) when a user issues voice commands such as "call home", "call 555-1234", "redial", "call voicemail", etc.

Device 46 (e.g., a cellular telephone headset) may be used to control power management functions in device 10. For example, device 46 may be used to wake up device 10 from a low-power or standby mode. With one suitable arrangement, circuitry in device 10 may sense activity associated with the use of device 46 such as when device 46 is coupled to or decoupled from device 10, when button 59 is pressed or otherwise activated, or when sound is detected through microphone 57. If desired, circuitry in device 10 may use a microphone such as microphone 57 to sense activity associated with the use of device 10 such as loud noises, silence, and other suitable tones and noises (e.g., circuitry in device 10 may detect microphone activity). When device 10 is in a standby (sleep) mode and senses activity from device 46 or a button on device 10, wake command control signals may be generated that cause sleeping circuitry to enter a full-power or active mode (e.g., the device may wake up from standby). If desired, button 59 may be a standby button which, when pressed, causes device 10 enter its standby mode.

Figure 4B:
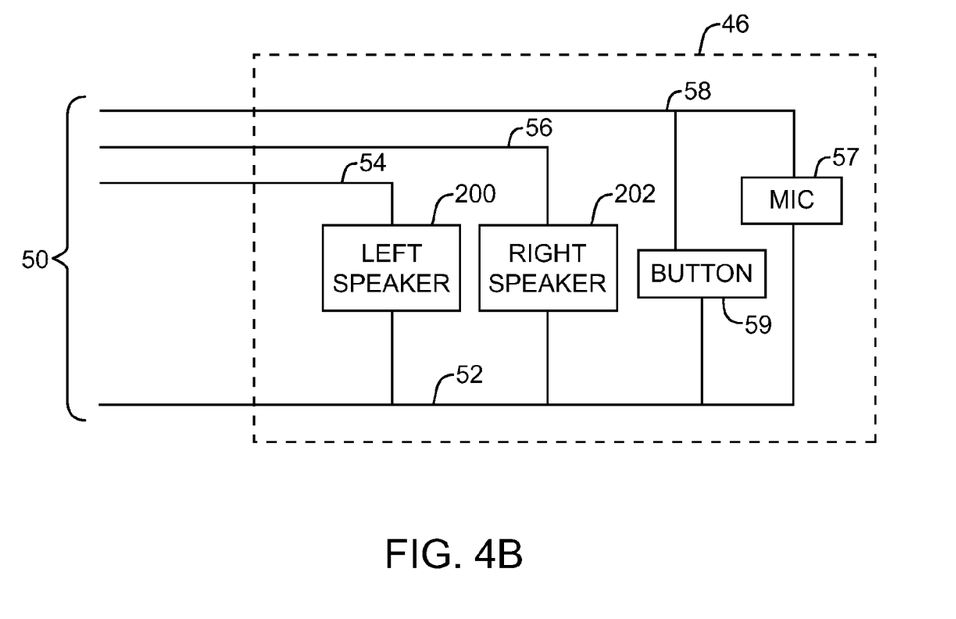
FIG. 4B is a circuit diagram of an illustrative headset device that has a microphone and a button wired together in parallel and that may be coupled to an electronic device with power management capabilities in accordance with an embodiment of the present invention.
Figure 4C:
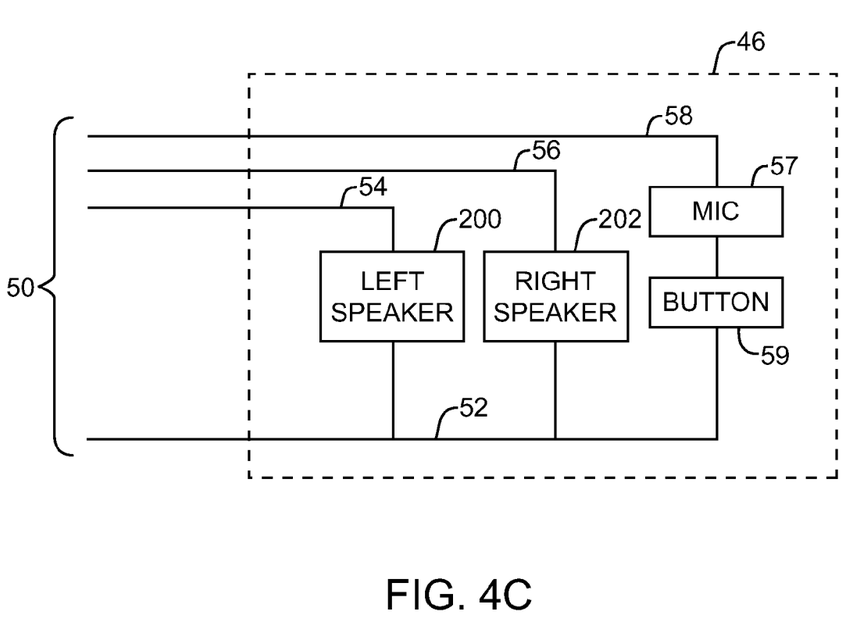
FIG. 4C is a circuit diagram of an illustrative headset device that has a microphone and a button wired together in series and that may be coupled to an electronic device with power management capabilities in accordance with an embodiment of the present invention.

As shown in FIGS. 4B and 4C, device 46 may have two speakers that together provide stereophonic (i.e., stereo) sound to a user. For example, device 46 may have a left speaker such as left speaker 200 and a right speaker such as right speaker 202 that together provide stereo to the user.

FIGS. 4B and 4C also show how button 59 and microphone 57 may share a common connection to device 10 (e.g., button 59 and microphone 57 may both be coupled to device 10 through path 58 and return path 52). In the FIG. 4B example, microphone 57 and button 59 are wired in parallel between paths 52 and 58. In this type of configuration, button 59 may temporarily short path 58 to path 52 when pressed, thereby producing a sudden increase in the current (i.e., a microphone bias current) flowing through path 52. This current increase can be detected by circuitry in device 10 (e.g., by a headset activity detection circuit). In the FIG. 4C embodiment, microphone 57 and button 59 are wired in series between paths 52 and 58. In this type of configuration, button 59 may temporarily isolate path 52 from path 58 when pressed, thereby producing a drop in the current flowing through path 52 that can be detected by circuitry in device 10.

With conventional power management schemes, it is often necessary to operate large blocks of circuitry, even in standby mode. Although button and headset activity can be detected when operating in this way, large amounts of power are consumed. In accordance with an embodiment of the present invention, low power circuits such as audio codec circuits can be used to monitor button and headset activity in sleep mode. This can reduce power consumption and extend battery life.

Figure 5:
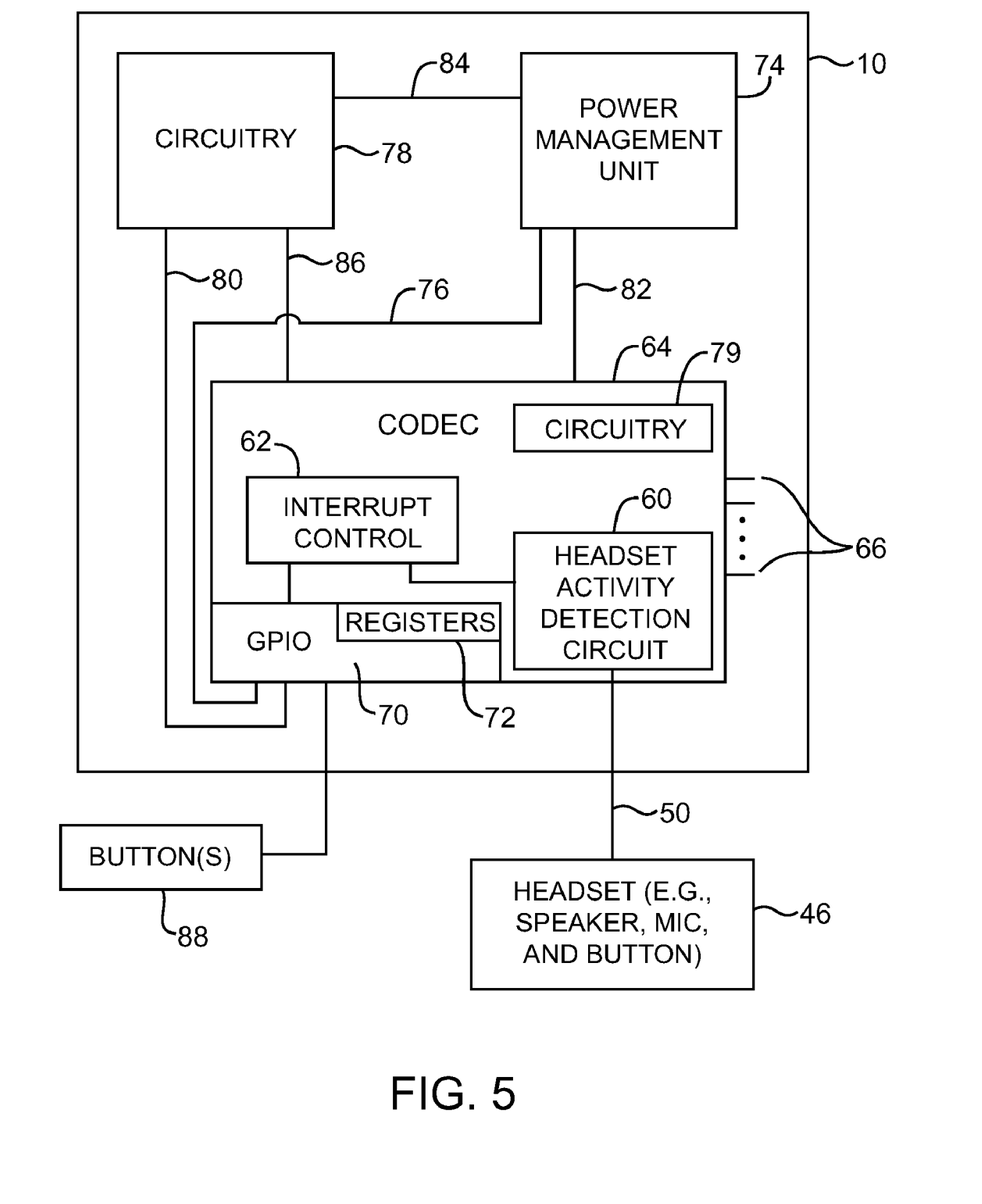
FIG. 5 is a circuit diagram of an illustrative electronic device and an illustrative headset in accordance with an embodiment of the present invention.

A circuit diagram showing circuitry that may be used in implementing power management functions in device 10 is shown in FIG. 5. As shown in FIG. 5, device 10 may have audio codec 64, one or more power management units such as power management unit 74, and other circuitry 78 (e.g., a central processor unit, etc.). Headset device 46 may be used in controlling the operation of device 10 and, as an example, may be used in controlling power management unit 74 when device 10 is operating in a standby mode. As illustrated by FIG. 5, device 46 may be coupled to device 10 over a path such as path 50. Path 50 may be a single cable with multiple conductors, as described in connection with FIGS. 4A, 4B, and 4C. Device 46 may be coupled to device 10 through a connector such as jack 23 (e.g., a headset jack).

Codec circuitry 64 may have headset activity detection circuitry 60. Headset activity detection circuitry 60 may be used to detect activity from headset device 46 over jack 23. For example, headset activity detection circuitry 60 may detect when device 46 is coupled to or decoupled from device 10 and may detect when a button such as button 59 is pressed. If desired, headset activity detection circuitry 60 may include a current detection circuit that detects sudden changes in a microphone bias current (e.g., a current that is continually passed through a microphone such as microphone 57 to operate the microphone when the microphone is coupled to device 10). As an example, headset activity detection circuitry 60 may detect changes in the microphone bias current that occur when button 59 is pressed and that occur when device 46 is coupled to or decoupled from device 10. When circuitry 60 detects activity associated with headset 46, circuitry 60 may convey relevant information to an interrupt control circuit such as circuit 62. For example, circuitry 60 may send signals to circuit 62 indicating that circuit 62 should assert an interrupt signal on path 80 or path 76.

Audio codec 64 may include reconfigurable input-output circuitry for handling general purpose input and output tasks. This circuitry is sometimes referred to as general purpose input-output circuitry. General purpose input-output circuitry such as GPIO circuitry 70 may be used to receive signals from one or more physical buttons on device 10 such as button(s) 88 (e.g., buttons such as ringer A/B switch 27, menu button 19, etc.). When circuitry 70 detects that one of the physical buttons on device 10 coupled to circuitry 70 has been pressed (i.e., moved, depressed, or released, depending on the how the button operates), circuitry 70 may convey relevant information to an interrupt control circuit such as circuit 62 in codec 64. For example, circuitry 70 may send signals to circuit 62 indicating that circuit 62 should assert on interrupt signal on path 80 or path 76.

Codec circuitry 64 and, in particular, circuitry 79 may provide device 10 with audio input and output capabilities as well as general purpose input and output capabilities. For example, codec circuitry 64 may be used to provide audio output signals to external devices and may be used to receive audio input signals from external devices. Digital-to-analog conversion circuitry in circuitry 79 may be used to create analog output signals for driving speakers. Analog-to-digital conversion circuitry in circuitry 79 may be used to digitize analog audio signals from a microphone. Circuitry 64 may also be used to send or receive control signals (e.g., signals from a physical button on device 10 such as button(s) 88 and from a button on headset 46 such as button 59). With one suitable arrangement, general purpose input and output (GPIO) functions such as receiving signals from buttons 19, 59, and 88 may be implemented using GPIO control circuitry 70.

GPIO registers 72 may be used to configure GPIO circuitry 70. For example, when device 10 is in a standby mode, GPIO registers 72 may be programmed with register settings that configure circuitry 70 to assert interrupt signals on path 76. Path 76 is connected to power management unit 74 so that the interrupt signals on path 76 are received by power management unit 74. When device 10 is in an active (e.g., a normal operational) mode, GPIO registers 72 may be programmed with register settings that configure circuitry 70 to assert interrupt signals on path 80. Path 80 is connected to circuitry 78, so this interrupt may be received by a central processing unit in device 10. Interrupt signals may asserted in response to any suitable conditions that are indicative of a need to transition between sleep and active modes (e.g., headset activity, button activity, application activity, etc.).

When activity is detected through circuit 60 (i.e., headset activity) or through GPIO circuit 70 (such as button(s) 88 activity), interrupt control circuitry 62 may receive information from circuit 60 or circuit 70 and may generate interrupt signals that are sent out of codec circuitry 64 through general purpose input-output circuitry 70. GPIO circuitry 70 may assert these interrupt signals on path 80 and path 76 depending on settings in registers 72 (e.g., settings that are associated with which mode device 10 is operating in). Circuitry 78 (e.g., a central processing unit and associated memory) may be used in loading appropriate settings data into registers 72.

Power management units may be used in managing the operation and power consumption of components in device 10. Power management units may, for example, receive power from a battery and may supply appropriately regulated direct current (DC) power supply voltages to integrated circuits and other components in device 10. State machine circuitry in the power management units may be used in controlling the behavior of the power management units in different device operating modes. As an example, circuitry in the power management units may be used to ensure that the power management units provide one set of DC output voltages when operating in an active mode and provide another set of DC output voltages when operating in a standby mode.

In a typical scenario, device 10 may include a "radio" power management unit that is always powered. The radio power management unit may be used to detect activity in wireless communications devices 44 (FIG. 2). For example, the radio power management unit may be used to listen for incoming wireless telephone calls. When an incoming call is detected, the radio power management unit may wake up appropriate circuitry in device 10 to ensure that the call can be handled properly.

Device 10 may also include a power management unit that manages the operation and power consumption of device 10 in response to other events. This power management unit, which is shown schematically as power management unit 74 of FIG. 5, may be used to supply DC power supply voltages to circuitry 78 (e.g., components such as volatile random-access memory, non-volatile memory such as boot flash memory, a central processing unit, display 16 and an associated touch screen, etc.) and audio codec circuitry 64. The power management unit may supply each integrated circuit and other component in device 10 with one or more power supply voltages. For example, lines such as lines 66 may be used by power management unit 74 to supply audio codec 64 with voltages such as a digital core voltage (e.g., 1.8 volts) a pin-driver voltage (e.g., 1.8 volts), and a headphone power voltage (e.g., that may be supplied at 3.0 volts during active mode and that may not be supplied during standby mode). If desired, one or more of lines 66 may be a common ground path (e.g., a 0 volt path sometimes referred to as a ground rail) that serves as a return path for currents sent to codec 64. Audio codec 64 may also be provided with a raw battery supply voltage that ranges, for example, from 3.0 to 4.2 volts.

General purpose input-output circuit 70 may be used in processing button activity from buttons 88 during normal operation. During normal operation, information on button presses may be passed to processing circuitry in circuitry 78 over paths such as path 86. This processing circuitry may use the button press data in operating device 10 (e.g., to display appropriate menu screens for the user in response to button presses, to change device settings in response to button presses, etc.). When standby criteria are satisfied, circuitry 78 can place device 10 in standby mode. In general, any suitable conditions may be used to place device 10 in standby mode. As an example, processing circuitry 78 may monitor activity levels in device 10 such as the presence or absence of button activity, the presence or absence of software application activity, etc. If a user-defined or default period of inactivity is reached, processing circuitry 78 may place device 10 in standby (e.g., processing circuitry 78 may direct system components such as a power management unit 74 and codec 64 to enter standby). As another example, a user may affirmatively place device 10 in standby using a button press, a software application option, or any other suitable standby request such as a standby request supplied using input devices 40. If desired, combinations of these arrangements may be used. For example, device 10 may be configured to enter standby following a default or user-defined period of inactivity provided that a user is not running certain applications. Standby mode may also be initiated upon completion of a task (e.g., when an outgoing email message has been sent or when device 10 completes the playback of a media file). These are merely illustrative examples. Processing circuitry 78 may be configured to place device 10 in standby mode when any suitable standby mode criteria have been satisfied.

When operating in standby mode, circuitry 78 may be powered down to reduce power consumption. While operating in this reduced power mode, relatively low-power circuitry associated with audio codec 64 (e.g., interrupt control circuit 62, headset activity detection circuit 60, and general-purpose input-output interface circuitry 70) may be used to monitor button activity and headset activity. If activity is detected, codec 64 may report the occurrence of this activity to power management unit 74 to initiate the process of waking up device 10 from standby mode. Activity may be reported to power management unit using an interrupt on path 76.

To ensure proper operation of audio codec 64 in both active and standby modes, codec 64 may be reconfigured when device 10 switches between its active and standby modes (e.g., by loading registers such as registers 72 with appropriate settings). When placed in its active mode configuration, audio codec 64 will assert the interrupt on path 80 in response to detected activity. When placed in its standby mode configuration, audio codec 64 will assert the interrupt on path 76 in response to detected activity. Settings data for registers in codec 64 (e.g., for registers 72) may be stored in memory. During reconfiguration operations, a central processing unit or other circuitry 78 may load the settings data from memory into registers in codec 64 over a path such as path 86. Path 86 may be, for example, a bidirectional control bus such as an I²C bus.

Power management unit 74 may have state machine circuitry that controls the operation of power management unit 74 in active mode and standby mode. Power management unit 74 may produce one set of outputs when operating in active mode and may produce another set of outputs when operating in standby mode.

During normal operation of device 10, power management unit 74 may be in its active state and GPIO circuitry 70 may be configured to provide interrupt signals to circuitry 78 (i.e., a central processor in device 10) over path 80. When device 10 is in its active mode and circuitry 78 receives an interrupt signal such as an interrupt from circuitry 62, circuitry 78 may interrogate components in device 10 to determine the source and cause of the interrupt and, after the source and cause are determined, circuitry 78 may perform an associated action. For example, when button 59 is pressed, interrupt control 62 may produce an interrupt that is sent (by GPIO 70) to circuitry 78 over path 80. Circuitry 78 may respond to the interrupt by sending a query to circuitry 64 over path 86 to determine what event triggered the interrupt. In this example, circuitry 64 will inform circuitry 78 that button 59 was pressed and circuitry 78 will take an appropriate action. If desired, power management unit 74 may assert interrupt signals on path 84 (e.g., which may include an interrupt line) when power management unit 74 needs to signal an event to processing circuitry 78.

When device 10 is in its standby mode, GPIO circuitry 70 may be configured to provide interrupt signals to circuitry 74 (i.e., a power management unit) over path 76. When device 10 is in its standby mode and circuitry 74 receives the interrupt from circuitry 62, circuitry 74 may wake up device 10 (e.g., circuitry 74 may place device 10 in its active mode). When device 10 wakes up from its standby mode, circuitry 78 may interrogate power management unit 74 to determine the source and cause of the wake up event (i.e., the reason why device 10 woke up from its standby mode). Circuitry 78 may interrogate power management unit 74 using a bi-directional communications path such as path 84, as an example. In response to this interrogation, power management unit may send signals over path 84 to circuitry 78 that inform circuitry 78 of the source of the wake up event (i.e., circuitry 64). Circuitry 78 may then query the source of the wake up event (i.e., circuitry 64) to determine the cause of the wake up event (e.g., whether a button was pressed, whether a headset was removed or attached, etc.). Once circuitry 64 informs circuitry 78 of the nature of the wake-up activity, circuitry 78 may take appropriate action. If desired, circuitry 74 may send signals over path 84 to circuitry 78 indicating the source of the wake up event along with signals indicating the cause of the wake up event (e.g., so that circuitry 78 need not interrogate circuitry 64 directly).

Circuitry 79 may include circuitry such as digital-to-analog converters, analog-to-digital converters, audio amplifiers, speaker drivers (e.g., headphone amplifiers), digital signal processors, microphone amplifiers, microphone biasing circuitry, and other audio circuitry. With one suitable arrangement, circuitry 79 may include circuitry that interfaces with a microphone (e.g., a microphone in device 10 or in headset 46).

Circuitry 78 may, in general, include any circuitry in device 10 such as processing circuitry 36, circuitry associated with storage 34, circuitry associated with input-output devices 38, etc.

To minimize power consumption, processing circuitry 78 may send signals to components in device 10 such as codec circuitry 64 and power management unit (PMU) 74 to direct the components reduce their power consumption (e.g., by turning off unnecessary components) and may enter its standby mode. For example, processing circuitry 78 may send signals to components in device 10 to reduce their power consumption. If desired, the last signals sent by processing circuitry 78 as it enters its standby mode may be signals to power management unit 74 instructing unit 74 to turn off processing circuitry 78. Standby mode may be entered at any suitable time (e.g., after a period of inactivity, when a user selects an on-screen sleep option on display 16, when a user presses a sleep button on device 10, etc. When device 10 enters its standby mode, circuitry 78 and/or unit 74 may produce signals that are used to reduce the power consumption of device 10 (e.g., by turning off unnecessary components). The signals produced by circuitry 78 and power management unit 74 may include control signals, power supply signals (such as power supply signals provided to codec 64 over paths 66), clock signals, etc. These signals may be provided over any suitable path such as paths 82, 84, and 86. When circuitry 64 receives appropriate signals from circuitry 78 or power management unit 74, circuitry 64 may shut down circuitry 79 and circuitry 78 may shut down large portions of its circuitry or may power down completely, thereby minimizing the power consumption of device 10 and maximizing the device's battery life. With one suitable arrangement, when device 10 is operating in a standby mode, processing circuitry, storage circuitry, displays, and other suitable components of device 10 are either turned off or are operated in a low power mode.

When device 10 enters its standby mode, registers 72 in GPIO circuitry 70 may be programmed so that future interrupt signals (sometimes referred to as flags) are asserted on path 76, rather than path 80. Registers 72 may be reprogrammed using data provided by circuitry 78 (as an example). When device 10 enters its active mode, registers 72 may be programmed so that future interrupt signals are asserted on path 80, rather than path 76.

When a user interacts with device 10 or when another action is taken that makes it appropriate for device 10 to power up, device 10 may resume normal operations (e.g., device 10 may power up from standby and may enter its active mode). For example, if device 10 is a cellular telephone, device 10 may power up from standby when device 10 receives a text message, a voice mail alert, or an incoming telephone call. Device 10 may also power up as a result of internal activity such as an alarm or a calendar event. Device 10 may wake up when a headset such as headset 46 is coupled to or is decoupled from device 10 (i.e., when headset 46 is connected to or disconnected from a jack such as jack 23).

Because interrupt control circuit 62, headset activity detection circuit 60, and GPIO circuit 70 preferably remain active during standby mode, a user may wake up device 10 by interacting with any suitable user input-output devices such as user input devices 40, headset 46 (e.g., button 59), buttons 19, 27, and 88, etc. For example, a user may wake up device 10 by attaching or detaching a headset such as headset 46 to device 10 through jack 23. In situations in which device 10 is a handheld device with cellular telephone capabilities, buttons 88 may include a switch such as switch 27 that is sometimes referred to as a ringer A-B switch and that selects whether device 10 has a silent telephone ring (e.g., is in a silent or vibrate mode) or has an audible telephone ring. If desired, activity on the ringer A-B switch 27 (or headset 46) may cause device 10 to temporarily enter its active mode to adjust internal settings (e.g., such as configuring device 10 so that future incoming calls activate a vibrator rather than an audible telephone ring). Device 10 may thereafter reenter its standby mode. Power management circuitry 74 may send signals over paths such as paths 82 and 84 to direct circuitry 64 and 78 to resume normal operations (e.g., power up) when desired. With one suitable arrangement, power management unit 74 may send signals over paths such as path 84 that wake up only processing circuitry 78. In this arrangement, software running on processing circuitry 78 may then be used to determine which portions or components in device 10 are needed and may then selectively power only those components by sending signals over paths such as paths 84 and 86.

In order to minimize the power consumption of device 10 while retaining the ability to detect activity on headset 46 and buttons on device 10 such as button 88 in standby mode, the central processing unit and other such circuitry 78 may be powered down and codec circuitry 64 may power down portions of circuitry such as circuitry 79 while circuits 60, 62, and 70 (which includes registers 72) remain powered. With one suitable arrangement, circuitry 60 may sense the presence (absence) of headset 46 by measuring the resistance between paths 52 and 56. This resistance may be essentially infinite when headset 46 is not coupled to device 10 and may have a finite value when headset 46 is coupled to device 10. These are merely illustrative examples. In general, circuitry 60 may sense activity in headset 46 (or button 88) using any suitable technique. Circuitry 60 may be able to sense headset and button activity while circuit 64 is consuming only, for example, approximately 8 milliwatts of power. Once this activity is detected, the central processing unit and other circuitry 78 on device 10 may be powered up. The power-up process may be initiated by placing power management unit 74 in its active state, even while the central processing unit is in standby mode. Conventional arrangements in which a central processing unit remains powered to detect headset activity may result in power consumption levels of over 100 mW.

Figure 6A:
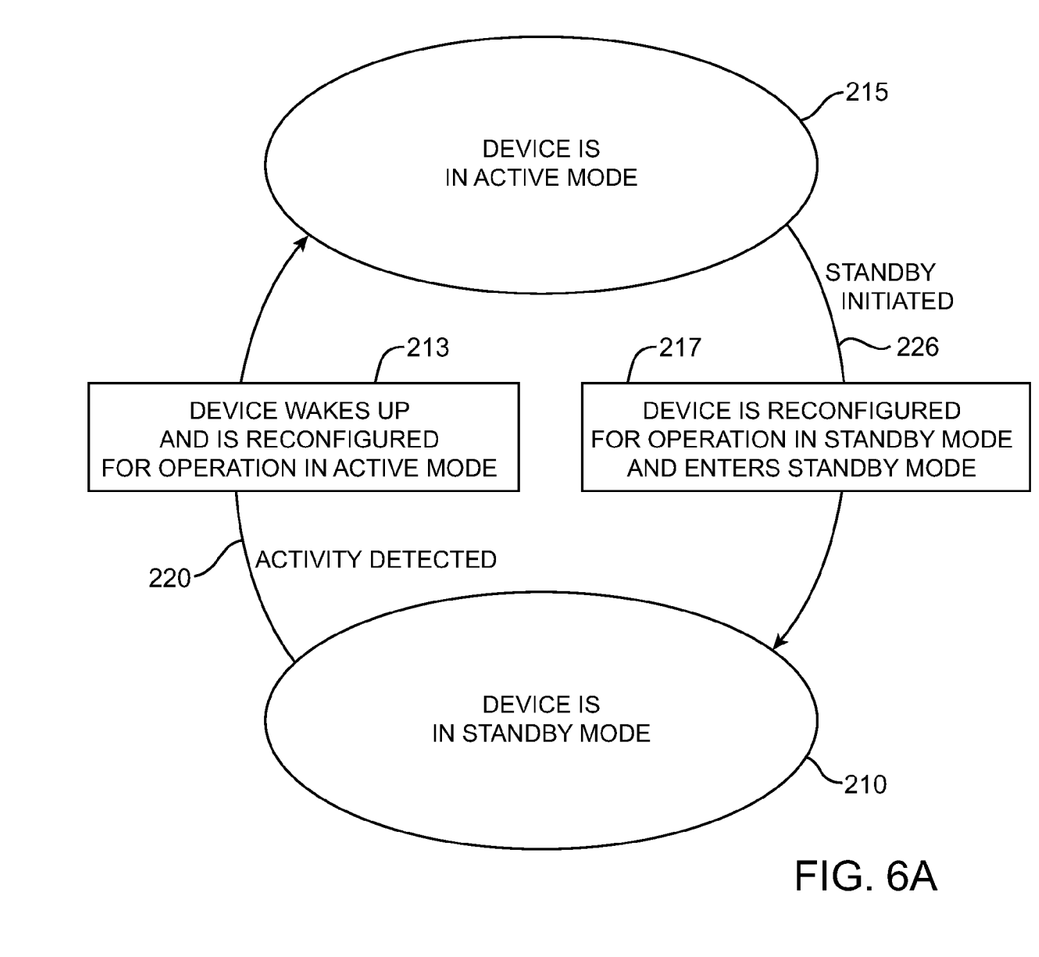
FIG. 6A is a state diagram of illustrative operating modes of an illustrative electronic device with power management capabilities in accordance with an embodiment of the present invention.

As illustrated in FIG. 6A, a device such as device 10 that has power management capabilities may operate in multiple modes to conserve power.

In mode 215, device 10 is in an active mode. When device 10 is in its active mode, power management unit 74 may be in its active state and central processing circuitry such as an application processor or circuitry 78 may be powered. Codec circuitry 64 and other components in device 10 may be power or unpowered as needed.

As illustrated by standby initiated line 226, when it is desired to reduce the power consumption of device 10, device 10 may enter standby mode 210. Device 10 may enter standby mode 210 when a user actively commands device 10 to enter its standby mode, when device 10 has not received any user input for some period of time, when battery levels drop below a certain threshold, or for any other suitable reason.

As device 10 enters its standby mode, device 10 may perform the operations of box 217. For example, as device 10 enters its standby mode, device 10 may reconfigure itself for proper operation in standby mode and then enter standby mode 210. Device 10 may reconfigure itself by shutting down components in device 10, by providing updated register data to registers 72, and by placing power management unit 74 in its standby state, as an example. After performing the operations of box 217, device 10 is in standby mode 210.

In standby mode 210, device 10 is operating in a low-power mode. Codec circuitry 64 and other circuits in device 10 may be listening for activity such as user activity associated with a headset. For example, codec circuitry 64 may be monitoring path 50 for headset activity.

When activity such as headset activity is detected, device 10 may enter its active mode, as illustrated by line 220. As device 10 is entering its active mode, device 10 may perform the operations of box 213. For example, as device 10 enters its active mode, device 10 may provide power to wake up components in device 10 such as a central processor (e.g., circuitry 78) and device 10 may reconfigure itself to operate in its active mode (e.g., by placing power management unit 74 in its active state and providing updated register data to registers 72). After performing the operations of box 213, device 10 is in its active mode 215.

Figure 6B:
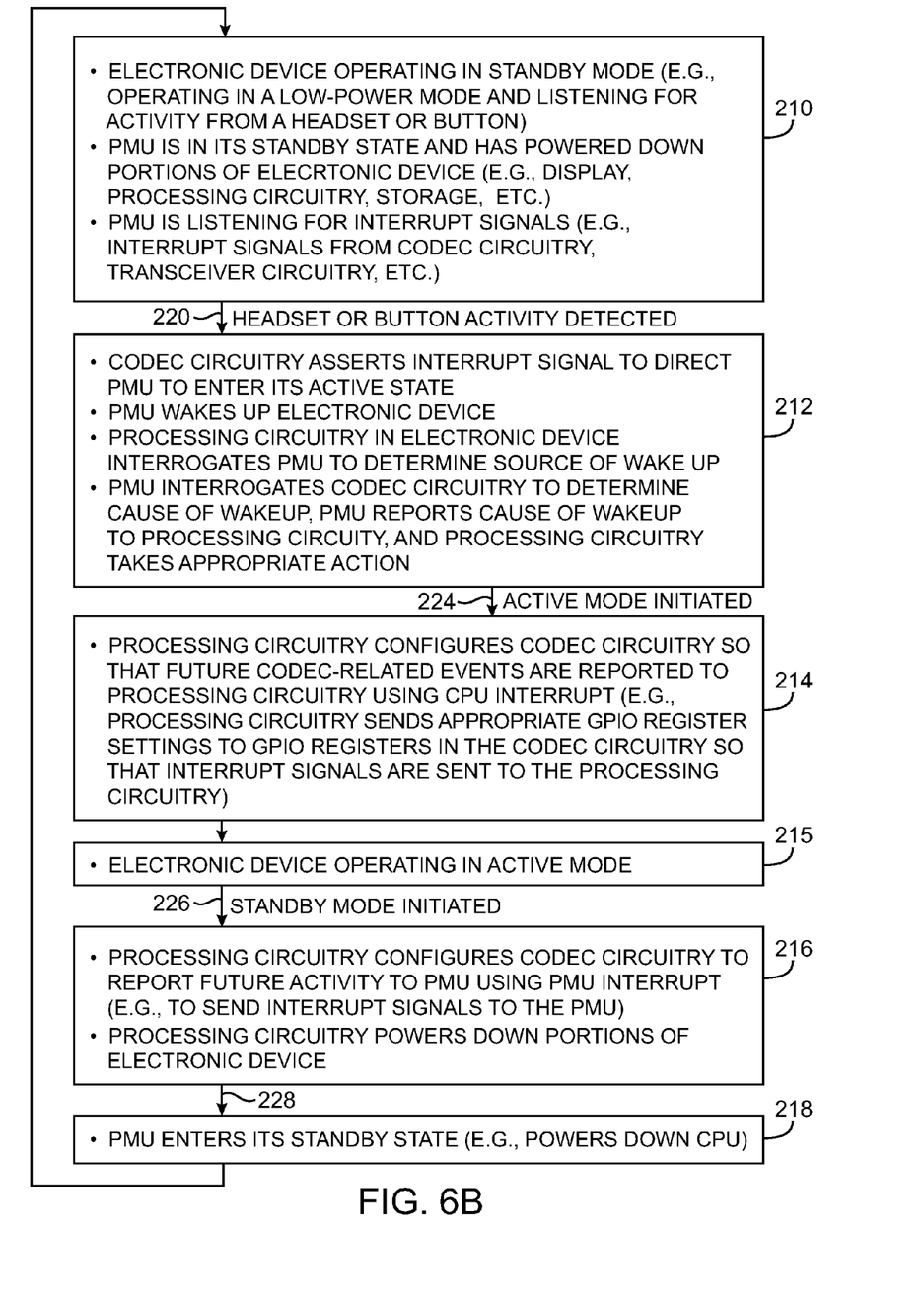
FIG. 6B is a flow chart of illustrative steps involved in using an electronic device with power management capabilities in accordance with an embodiment of the present invention.

FIG. 6B is a diagram of illustrative operating modes and steps involved in using a device such as device 10 that has power management capabilities of the type described in connection with FIG. 5.

In standby mode 210, device 10 and codec circuitry 64 may be operating in a low power mode (e.g., one or more of lines 66 such as a headset power line may be receiving a reduced DC power signal from power management unit 74 and some or all unneeded circuitry 79 such as unused input-output buffers, analog-to-digital and digital-to-analog converters may be powered down). While operating in this low power mode, coded circuitry 64 may monitor headset 46 and buttons 88 for activity. For example, headset activity detection circuit 60 may be used to monitor currents flowing over path 50. These currents may change with activity from headset 46 (e.g., when button 59 is pressed or when headset 46 is coupled to or decoupled from device 10). General purpose input-output circuitry 70 may be used to monitor signals from buttons such as buttons 88.

In standby mode 210, electronic device 10 may be in standby mode. In particular, power management unit 74 may be in its standby state and may be providing (or may have already provided) signals that power down portions of device 10 such as display 16, processing circuitry 36, storage 34, and other power-intensive components in circuitry 78 and device 10. Power management unit 74 may monitor the status of interrupt line 76. Codec circuitry 64 may assert an interrupt on path 76 when activity from a headset or button is detected. If desired, power management unit 74 may also listen for interrupt signals from other components in device 10. Such interrupts may, for example, be generated by wireless circuitry 44 in response to an incoming phone call (as an example) or may be generated by other components in device 10 that have remained active in the device's standby mode.

As indicated by line 220, when headset or button activity is detected (e.g., by circuitry 60 or 70), device 10 may take appropriate action at step 212. During the operations of step 212, codec circuitry 64 may assert an interrupt on path 76 to direct power management unit 74 to enter its active state. In response to the interrupt from circuitry 64, power management unit 74 may wake up device 10 (e.g., by supplying appropriate power supply signals to the central processing unit and other components of device 10). When device 10 wakes up from its standby mode, processing circuitry such as circuitry 78 may interrogate power management unit 74 to determine which component in device 10 caused the device to wake up (e.g., which component in device 10 such as codec circuitry 64, transceiver circuitry 44, etc. caused device 10 to wakeup). In response to the processing circuitry's interrogation, power management unit 74 may interrogate the component that initiated the wake up event (i.e., the codec circuitry) to determine the cause of the wake up event (e.g., the specific event that occurred such as a button press or the removal of device 46 from the audio jack) and may report the cause of the wakeup to the processing circuitry. If desired, the processing circuitry may interrogate the component that initiated the wake up event directly (rather than through the power management unit). Once the processing circuitry has determined the specific event that cause device 10 to wake up, the processing circuitry can take an appropriate action.

Device 10 may enter its active mode following the detection of headset or button activity, as indicated by line 224. When device 10 enters its active mode (step 214), processing circuitry (e.g., circuitry 36 and/or circuitry 78) may use path 86 to load registers 72 with settings data that configure codec circuitry 64 so that future events are reported directly to the processing circuitry. For example, the processing circuitry may send updated register settings to registers 72 so that future interrupt signals from interrupt control 62 are sent over path 80 to the processing circuitry (rather than over path 76 to power management unit 74).

In step 215, electronic device 10 may be in its active mode. In the active mode, components in device 10 such as processing circuitry 78, audio codec circuitry 64, and other components in device 10 may be powered or unpowered as needed.

As indicated by line 226, when it is not necessary to fully power device 10, device 10 may enter its standby mode (steps 216 and 218). Device 10 may be automatically placed in standby mode when no user inputs have been received within a given period of time, when a user actively directs device 10 to enter standby mode by pressing an appropriate button or otherwise providing device with a command to enter standby, when the amount of remaining battery power in device 10 drops below a given value, or for any other suitable reason. Before device 10 enters its standby mode, processing circuitry (i.e., circuitry 36 and/or 78) may configure codec circuitry 64 to report future activity to power management unit 74. For example, processing circuitry may send updated register settings to registers 72 over path 86 so that general purpose input-output circuitry 70 is configured to convey interrupt signals from interrupt control circuit 62 to power management unit 74 over path 76. In step 216, processing circuitry (i.e., circuitry 36 and/or 78) may power down portions of device 10.

As indicated by line 228, following the operations of step 216, power management unit 74 may enter its standby state 210 and may power down processing circuitry such as circuitry 36 and/or circuitry 78 (e.g., in step 218).

The foregoing is merely illustrative of the principles of this invention and various modifications can be made by those skilled in the art without departing from the scope and spirit of the invention.

What is claimed is:

1. A portable electronic device, comprising:
   processing circuitry;
   a power management unit; and
   an audio codec circuit coupled to the processing circuitry and the power management unit, wherein the audio codec circuit includes general-purpose input-output circuitry that receives input from a button and that directs the power management unit to transition from a standby mode of operation to an active mode of operation when button activity from the button is detected, wherein the processing circuitry is configured to place the device in the standby mode of operation to conserve power in response to a first interrupt from the audio codec circuit.

2. The portable electronic device defined in claim 1 wherein the processing circuitry is configured to place the portable electronic device in the standby mode of operation when it is determined that standby mode criteria have been satisfied.

3. The portable electronic device defined in claim 1 wherein the processing circuitry is configured to place the portable electronic device in the standby mode of operation when directed to enter the standby mode by a user request.

4. The portable electronic device defined in claim 1 wherein the processing circuitry is configured to place the portable electronic device in the standby mode of operation when the portable electronic device has been inactive for a given inactivity period.

5. The portable electronic device defined in claim 1 further comprising a path between the audio codec circuit and the power management unit, wherein the audio codec circuit asserts a second interrupt on the path to direct the power management unit to transition from the standby mode of operation to the active mode of operation when the audio codec detects the button activity.

6. The portable electronic device defined in claim 5 wherein the path comprises a first of two paths, wherein a second of the two paths is coupled between the audio codec and the processing circuitry, wherein the audio codec asserts the first interrupt on the second path.

7. The portable electronic device defined in claim 6 further comprising a bus between the processing circuitry and the audio codec circuit that conveys register settings for the audio codec circuit to configure the audio codec:
    to assert the second interrupt on the first path when the button activity is detected by the audio codec circuit while the audio codec circuit is in active mode; and
    to assert the first interrupt on the second path when the button activity is detected by the audio codec circuit while the audio codec circuit is in standby mode.

8. The portable electronic device defined in claim 7 further comprising a connector that is used in connecting the audio codec circuit to an external headset having a headset button, wherein the button activity is detected by the audio codec circuit when a user operates the headset button.

9. The portable electronic device defined in claim 7 further comprising a button that is coupled to the audio codec circuit.

10. The portable electronic device defined in claim 7 wherein the audio codec circuit comprises a general purpose input-output circuit that is connected to a button, wherein the general purpose input-output circuit is used in detecting the button activity.

11. The portable electronic device defined in claim 7 wherein the audio codec circuit comprises a general purpose input-output interface circuit that generates the first and second interrupts for the first and second paths.

12. The portable electronic device defined in claim 11 further comprising a button that is coupled to the general purpose input-output interface circuit, wherein the general purpose input-output circuit handles button activity from the a button for the device.

13. The portable electronic device defined in claim 1 further comprising a bus between the processing circuitry and the audio codec circuit that conveys register settings for the audio codec.

14. A portable electronic device, comprising:
    processing circuitry;
    a power management unit;
    an audio codec circuit coupled to the processing circuitry and the power management unit, wherein the audio codec circuit includes general-purpose input-output circuitry that receives input from a button and that directs the power management unit to transition from a standby mode of operation to an active mode of operation when button activity from the button is detected;
    a bus between the processing circuitry and the audio codec circuit that conveys register settings for the audio codec, wherein the audio codec circuit comprises a general purpose input-output circuit that has associated registers and wherein the register settings conveyed over the bus are loaded into the registers to configure the general purpose input-output circuit.

15. A method for operating a portable electronic device having processing circuitry, a power management unit, and an audio codec with registers that control the operation of the audio codec, comprising:
    with the processing circuitry, loading settings into the registers that configure the audio codec to provide a first interrupt to the power management unit when button activity is detected by the audio codec while the portable electronic device is in a standby mode of operation; and
    with the processing circuitry, loading settings into the registers that configure the audio codec to provide a second interrupt to the processing circuitry when an event is detected by the audio codec while the portable electronic device is operating in an active mode of operation.

16. The method defined in claim 15 wherein the event comprises an event that is indicative that the device is to enter the standby mode of operation.

17. The method defined in claim 16 wherein the event comprises button activity, the method comprising:
    with general purpose input-output circuit in the audio codec, directing the power management unit to transition to a standby mode in response to the button activity.

18. The method defined in claim 15 wherein the button activity comprises headset button activity, the method further comprising:
    in response to the detected headset activity, asserting the first interrupt with the audio codec.

19. The method defined in claim 18 further comprising:
    powering down unused circuitry in the audio codec during the standby mode.

20. The method defined in claim 15 wherein the loaded settings in the registers configure the audio codec to provide the first interrupt to the power management unit when microphone activity is detected by the audio codec while the portable electronic device is in the standby mode, the method further comprising:
    in response to the detected microphone activity, asserting the first interrupt with the audio codec.

21. The method defined in claim 15 further comprising:
    when no user inputs are received by the portable electronic device within a given period of time, directing the power management unit to transition to a standby mode.

22. A method for minimizing power consumption in a portable electronic device that has audio codec circuitry, a headset jack, a power management unit, and processing circuitry, wherein the audio codec circuitry has a headset activity detection circuit that detects activity on the headset jack, has first and second outputs that are respectively coupled to the power management unit and the processing circuitry, and has a register that contains register data and wherein the audio codec circuitry asserts an interrupt signal on a given one of its outputs when it detects activity on the headset jack, the method comprising:
    when placing the portable electronic device in a standby mode, providing register data to the register that configures the audio codec circuitry so that the interrupt signal is asserted on the first output and is received by the power management unit; and
    when placing the portable electronic device in an active mode, providing register data to the register that configures the audio codec circuitry so that the interrupt signal is asserted on the second output and is received by the processing circuitry.

23. The method defined in claim 22 further comprising:
    when the portable electronic device enters the standby mode, powering down the processing circuitry; and when the portable electronic device enters the active mode, powering up the processing circuitry.

24. The method defined in claim 23 further comprising:
with the headset activity detection circuit, detecting activity on the headset jack, wherein detecting activity on the headset jack comprises detecting the coupling of a headset to the headset jack.

25. The method defined in claim 23 further comprising:
with the headset activity detection circuit, detecting activity on the headset jack, wherein detecting activity on the headset jack comprises detecting the decoupling of a headset from the headset jack.

26. The method defined in claim 23 wherein the headset jack receives a headset with a headset button, the method further comprising:
with the headset activity detection circuit, detecting activity on the headset jack, wherein detecting activity on the headset jack comprises detecting the decoupling of the headset from the headset jack, detecting the coupling of the headset to the headset jack, and, when the headset is coupled to the portable electronic device, detecting when the headset button is pressed.

27. The method defined in claim 23 wherein the audio codec circuitry has an input coupled to a button, wherein the audio codec circuitry asserts the interrupt signal on the given one of its outputs when it detects activity on the input that is coupled to the button, and wherein the headset jack receives a headset with a headset button, the method further comprising:
with the headset activity detection circuit, detecting activity on the headset jack, wherein detecting activity on the headset jack comprises:
detecting the decoupling of a headset from the headset jack;
detecting the coupling of the headset to the headset jack; and
when the headset is coupled to the portable electronic device, detecting when the headset button is pressed; and
with the audio codec circuitry, detecting when the button is pressed, wherein the audio codec circuitry asserts the interrupt signal on the given one of its outputs when it detects activity on the input coupled to the button.

28. The method defined in claim 27 further comprising:
when the power management unit receives the interrupt signal, configuring the portable electronic device to operate in the active mode, wherein configuring the portable electronic device to operate in the active mode comprising powering up the processing circuitry.

29. The method defined in claim 23 wherein the audio codec circuitry has an input coupled to a button, the method further comprising:
with the audio codec circuitry, detecting when the button is pressed; and
in response to detecting activity on the input coupled to the button, asserting the interrupt signal on the given one of the audio codec circuitry outputs.

* * * * *